Sept. 24, 1957
J. GILBERT ET AL
2,807,300
FOOD CUTTING DEVICES WITH SELECTIVE CUTTERS
Filed Sept. 9, 1955
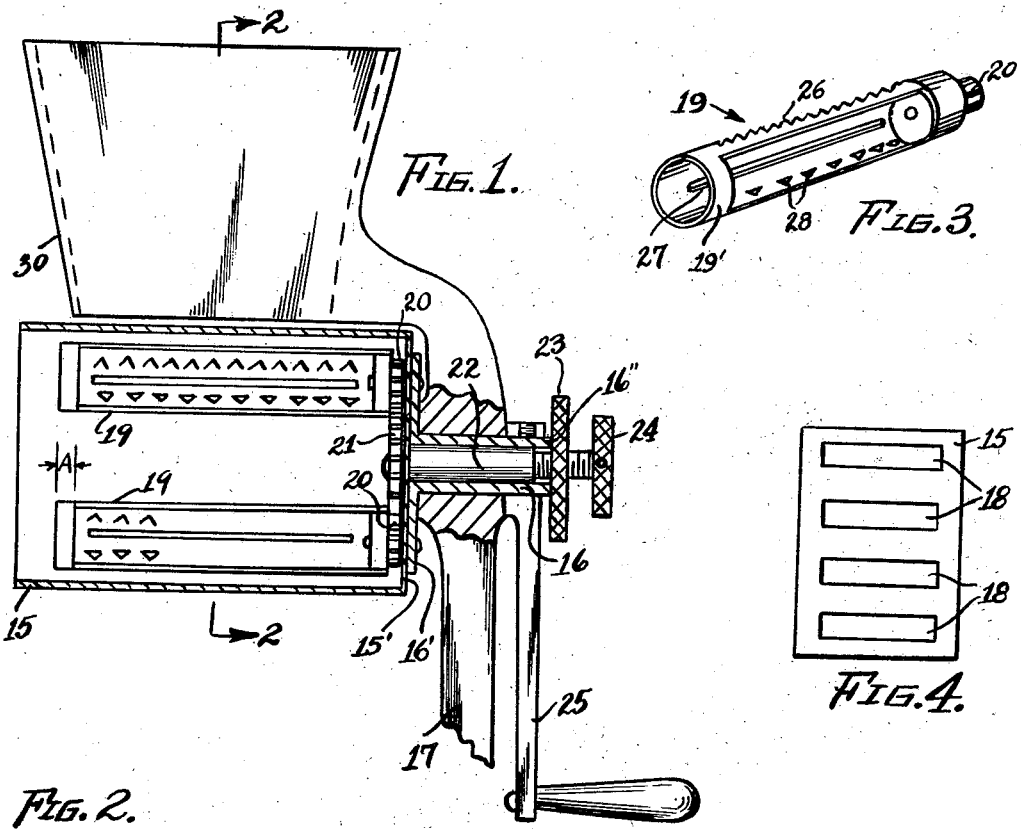
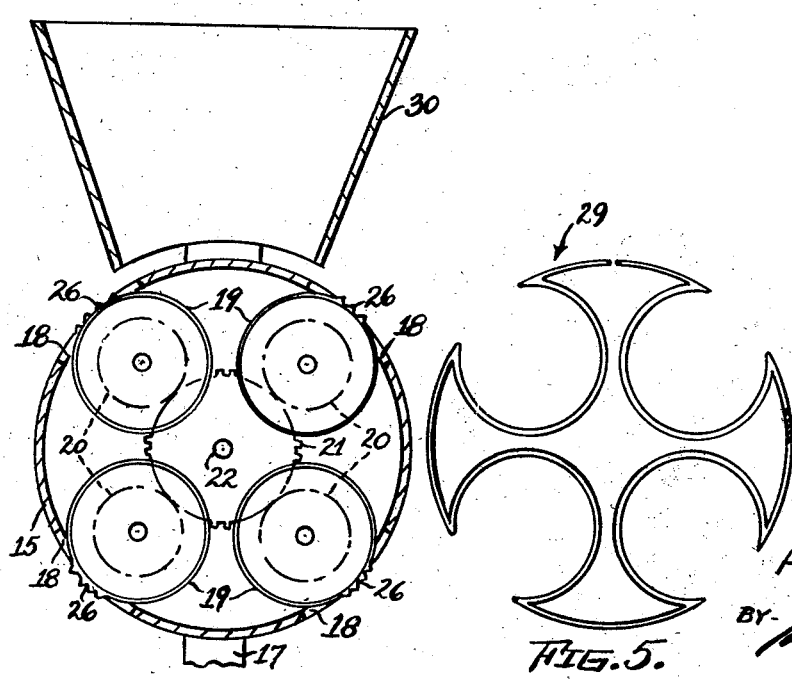
INVENTORS,
JACK GILBERT and
HARRY PREBLE, JR.,
BY
ATTORNEY

United States Patent Office 2,807,300
Patented Sept. 24, 1957

2,807,300
FOOD CUTTING DEVICES WITH SELECTIVE CUTTERS

Jack Gilbert, Newburgh, and Harry Preble, Jr., Cross River, N. Y., assignors to General Slicing Machine Co., Inc., Walden, N. Y., a corporation of New York Application September 9, 1955, Serial No. 533,419

6 Claims. (Cl. 146—91)

The present invention relates to devices used for grating, shredding and slicing of vegetables, fruits and other food masses and more particularly to the type embodying a rotatable member presenting suitable cutting elements.

Heretofore, apparatus of this category employed a set of different cutting drums or discs, which were interchanged according to the character of the cutting operation desired to be performed.

The principal object of this invention is to provide a food cutting device of the character set forth, of novel and improved construction, requiring no dismantling or interchanging of parts for accomplishing various kinds of cutting operations selectively, but to have the device a unitary structure affording adjustment to alter the cutting elements presented into operative position to do the work, while cutting elements which do other types of work are kept in inoperative position.

Another object hereof is to provide a novel and improved food cutting device of the nature described, affording means whereby by a simple manipulation, it is set to do the type of cutting work desired.

A further object hereof is to provide a novel and improved cutting device for edibles, of the category set forth, which is reasonable in cost to manufacture, easy to use and efficient in carrying out the purposes for which it is designed.

Other objects and advantages will become apparent as this disclosure proceeds.

For the practice of this invention, its teachings are shown applied in two different embodiments. In the first, there is a rotatable drum having a plurality of lengthwise slots which are preferably equi-spaced. Interior this drum, are a number of auxiliary drums, as they may be termed, positioned lengthwise along the length of the main drum. These auxiliary drums, which protrude, one into each of said slots, are formed with different types of cutters arranged in lengthwise lanes similarly on each of them. Said auxiliary drums are rotatable on the main drum and capable of being fixed thereon against rotation when in a desired position. Also shown is a means to set all the auxiliary drums simultaneously. In the second embodiment, there is a rotatable disc having a plurality of openings therethrough about its axis. The cutting elements are similarly arranged in sectors on auxiliary discs which are rotatably mounted on the main disc and capable of being fixed in any desired position. Similar sectors of the auxiliary discs are exposed in the openings through the main disc.

In the accompanying drawings forming part of this specification, similar characters of reference indicate corresponding parts in all the views.

Fig. 1 is a side view of a hand-driven device suitable for kitchen use, embodying the teachings of this invention. This view is partly in section.

Fig. 2 is a slightly enlarged section taken at lines 2—2 in Fig. 1. The auxiliary drums are a bit out of proportion in respect to the main drum as regards the scale of drawing of Fig. 1.

Fig. 3 is a perspective view of one of the auxiliary drums, drawn to the scale of Fig. 1.

Fig. 4 is a development of the main drum drawn to a smaller scale.

Fig. 5 is drawn to the scale of Fig. 2, and shows an end view of a piece made of strip metal, used as a bearing support for the free ends of the auxiliary drums within the main drum.

In the drawings, one of the structural forms this invention may assume, is shown in Fig. 1, where the numeral 15 designates generally a horizontally positioned drum having a closed end 15′ and whose other end is open. The end 15′ is concentrically mounted on the circular flange 16′ of a bushing 16 to rotate therewith and if desired can be made detachable therefrom as is well known in this art. Said bushing 16 is rotatably mounted in a bearing on the frame 17 which may terminate in the form of a pedestal base or clamp not shown, but also well known in this art. The peripheral wall of the drum 15 is provided with a plurality of preferably equi-spaced longitudinal slots 18 through which are presented peripheral portions of what may be called the auxiliary drums 19. These auxiliary drums are within the main drum 15 and lie therein lengthwise along said main drum. Each of the auxiliary drums are closed at the closed end of the main drum, and each carries a gear 20 secured coaxially therewith respectively. Said auxiliary drums are rotatably mounted on the closed end 15′ of the main drum, which carries a rotatable gear 21 in engagement with all the gears 20. The gear 21 is secured to a stud shaft 22 which extends through and is rotatably fitted in the bushing 16. Said shaft 22 is threaded at its free end where it carries the lock nut 23 next to the protruding end of said bushing 16, while at its very end, it has secured thereon the turn knob 24. All the auxiliary drums 19 are identical and so are their gears 20. For the hand-driven kitchen-use device illustrated, a handle 25 is detachably secured on the protruding portion 16″ of the bushing.

Each auxiliary drum has similarly arranged adjacent longitudinal lanes formed with different types of cutting elements. The cutting elements 26 are for grating. The cutting edge 27 is for slicing and the cutting elements formed by the openings 28 are for shredding. These cutting lanes take up but a portion of the peripheral wall of the auxiliary drums 19. The remainder of these walls is for the most part cut away so that cut food stuff may fall into and then out of the main drum 15, but in the embodiment shown, there are end rings 19′ which are supported rotatably in the formed piece 29 made of strip stock and frictionally fitted in zone indicated by the letter "A" within the main drum 15.

The cutting lanes on the auxiliary drums 19 are equi-spaced and the openings 18 in the main drum 15 are each of a width to expose but one of said lanes at a time.

To use this kitchen device, the lock nut 23 is loosened. Then, holding the main drum 15 in hand so that it be stationary, the knob 24 is turned to set the auxiliary drums 19 simultaneously into position so that the desired lane of cutting means is exposed through the openings 18 respectively. All the gears 20 being of equal size, the auxiliary drums will be moved equally to effect their setting. Now the lock nut 23 is tightened against the bushing end 16″, thus locking all the auxiliary drums to the main drum. The food to be comminuted is held in the hopper 30 and pressed against the main drum 15 while the crank handle 25 is turned.

If the main drum 15 is made detachable from the flange 16′, and if the lock-nut 23 and the knob 24 are made removable off the shaft 22, the main drum and all it carries can be separated from the frame 17 for easy cleaning.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

We claim:

1. In a food cutting device of the character described, a frame, a main drum rotatably mounted on the frame and provided with a plurality of spaced openings arranged to pass a region of the frame in succession, means for moving said main drum associated with said member, a plurality of auxiliary drums, each rotatably mounted on said main drum for movement thereon across said openings respectively, means on at least one of said drums to secure all said drums against relative rotation; each of said auxiliary drums having cutting elements of different types arranged in separate zones thereon; the said auxiliary drums having such movement on the main drum, whereby they are positionable thereon so that only one selected type of cutting element are presented at said openings in the main drum and means on the frame to hold a food mass in the path of movement of said openings and in contact with the main drum but against movement with said main drum, where upon movement of said main drum, the cutting elements presented at said openings will act on the food mass.

2. The device as defined in claim 1, including a gear train having a gear carried by each of the auxiliary drums respectively and wherein the cutting element zones are correspondingly arranged on all the auxiliary drums, where upon movement of any gear of said train, all the auxiliary drums will be moved so that each will present one selected type of cutting element at said openings.

3. The device as defined in claim 1, wherein is included means associated with the auxiliary drums whereby upon movement of any one of them, all will move simultaneously.

4. The device as defined in claim 1, wherein is included means associated with only one of said drums to secure all the auxiliary drums to the main drum simultaneously against relative movement and including means associated with the auxiliary drums whereby upon movement of any one of them, all will move simultaneously.

5. The device as defined in claim 1, including gears, carried one on each drum; all said gears being in mesh engagement and including means to turn the gear which is on the main drum whereby all the auxiliary drums will be moved simultaneously and means carried on said device for halting the movement of the gear on the main drum; said latter gear being rotatably mounted on said main drum.

6. In a food cutting device of the character described, a frame, a main member rotatably mounted on the frame and provided with a plurality of spaced openings arranged to pass a region of the frame in succession, means for rotating said main member associated with said member, a plurality of auxiliary members, each rotatably mounted on said main member for movement thereon across said openings respectively, means on at least one of said members to secure all of said members against relative movement; each of said auxiliary members having cutting elements of different types arranged in separate zones thereon; said auxiliary members being positionable on the main member so that only one selected type of cutting element is presented at said openings in the main member, means on the frame to hold a food mass in the path of movement of said openings and in contact with the main member but against movement with said main member, where upon movement of said main member, the cutting elements presented at said openings will act on the food mass and a gear train having a gear carried by each of the auxiliary members respectively; the cutting element zones being correspondingly arranged on all the auxiliary members where upon movement of any gear of said train, all the auxiliary members will be moved so that each will present one selected type of cutting element at said openings.

References Cited in the file of this patent

UNITED STATES PATENTS

| | | |
|---|---|---|
| 287,127 | Heisler | Oct. 23, 1883 |
| 879,417 | Segelcke | Feb. 18, 1908 |
| 1,041,495 | Liggett et al. | Oct. 15, 1912 |
| 1,715,929 | Kerr | June 4, 1929 |
| 2,263,869 | Bundschu | Nov. 25, 1941 |

FOREIGN PATENTS

| | | |
|---|---|---|
| 39,098 | Denmark | Aug. 6, 1928 |